(12) United States Patent
Arrasjid et al.

(10) Patent No.: US 11,216,312 B2
(45) Date of Patent: Jan. 4, 2022

(54) MANAGEMENT OF UNIT-BASED VIRTUAL ACCELERATOR RESOURCES

(71) Applicant: Virtustream IP Holding Company LLC, Bethesda, MD (US)

(72) Inventors: John Yani Arrasjid, Boulder Creek, CA (US); Derek Anderson, Roberts Creek (CA); Eloy F. Macha, Las Cruces, NM (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 186 days.

(21) Appl. No.: 16/054,056

(22) Filed: Aug. 3, 2018

(65) Prior Publication Data

US 2020/0042353 A1 Feb. 6, 2020

(51) Int. Cl.
*G06F 9/50* (2006.01)

(52) U.S. Cl.
CPC ............ *G06F 9/505* (2013.01); *G06F 9/5016* (2013.01); *G06F 9/5094* (2013.01)

(58) Field of Classification Search
None
See application file for complete search history.

(56) References Cited

U.S. PATENT DOCUMENTS

| | | | |
|---|---|---|---|
| 6,076,141 A * | 6/2000 | Tremblay | G06F 9/30021 711/108 |
| 8,473,959 B2 | 6/2013 | Box et al. | |
| 8,615,759 B2 | 12/2013 | Box et al. | |
| 8,799,920 B2 | 8/2014 | Lubsey et al. | |
| 9,027,017 B2 | 5/2015 | Box et al. | |
| 9,122,538 B2 | 9/2015 | Box et al. | |
| 9,378,044 B1 * | 6/2016 | Gaurav | G06F 9/5077 |
| 2011/0239215 A1 * | 9/2011 | Sugai | G06F 9/5088 718/1 |
| 2013/0268794 A1 * | 10/2013 | Hancock | G06F 7/57 713/323 |

(Continued)

OTHER PUBLICATIONS

Nvidia Tesla V100 GPU Architecture, WP-08608-001_v1.1, Aug. 2017, http://images.nvidia.com/content/volta-architecture/pdf/volta-architecture-whitepaper.pdf.

(Continued)

*Primary Examiner* — Matthew G Marini
(74) *Attorney, Agent, or Firm* — Ryan, Mason & Lewis, LLP

(57) ABSTRACT

Methods, apparatus, and processor-readable storage media for management of unit-based virtual accelerator resources are provided herein. An example computer-implemented method includes obtaining multiple accelerator device resource consumption measurements, wherein the measurements represent multiple accelerator device resource types consumed by one or more accelerator devices over a defined temporal interval; computing a composite unit of measurement of accelerator device resource consumption, attributable to the one or more accelerator devices over the defined temporal interval, by normalizing the multiple accelerator device resource consumption measurements using a scaling factor that is based at least in part on one or more static aspects of the one or more accelerator devices; and outputting the composite unit of measurement to at least one user.

20 Claims, 6 Drawing Sheets

(56) References Cited

U.S. PATENT DOCUMENTS

| | | | |
|---|---|---|---|
| 2014/0181178 A1* | 6/2014 | Sahoo | G06F 9/5072 |
| | | | 709/203 |
| 2015/0019896 A1* | 1/2015 | Anderson | G06F 9/30109 |
| | | | 713/324 |
| 2016/0019674 A1* | 1/2016 | Howard | G06Q 10/00 |
| | | | 345/619 |
| 2017/0249996 A1* | 8/2017 | Gottscho | G06F 11/3037 |

OTHER PUBLICATIONS

Training with Mixed Precision, NVIDIA User Guide DA-08617-001_v001, Jan. 2018, https://docs.nvidia.com/deeplearning/sdk/pdf/Training-Mixed-Precision-User-Guide.pdf.

* cited by examiner

FIG. 2

| LABEL | ACCELERATOR TYPE | ACCELERATOR PRECISION | ACCELERATOR COMPUTE PEAK (TFLOPS) | ACCELERATOR MEMORY (GB) | ACCELERATOR MEMORY BANDWIDTH (GB/s) | SCALING FACTOR |
|---|---|---|---|---|---|---|
| ACCELERATOR 1 | GPU TYPE 1 | HALF | 112 | 32 | 900 | NA |
| ACCELERATOR 1 | GPU TYPE 1 | SINGLE | 16 | 32 | 900 | 1.0 |
| ACCELERATOR 1 | GPU TYPE 1 | DOUBLE | 8 | 32 | 900 | 2.0 |
| ACCELERATOR 2 | TPU TYPE 1 | HALF | 1600 | 64 | 900 | 4.0 |
| ACCELERATOR 2 | TPU TYPE 1 | SINGLE | 800 | 64 | 900 | 8.0 |
| ACCELERATOR 2 | TPU TYPE 1 | DOUBLE | 400 | 64 | 900 | 16.0 |
| ACCELERATOR 3 | GPU TYPE 2 | HALF | 20 | 16 | 732 | NA |
| ACCELERATOR 3 | GPU TYPE 2 | SINGLE | 10 | 16 | 732 | 0.679 |
| ACCELERATOR 3 | GPU TYPE 2 | DOUBLE | 5 | 16 | 732 | 0.675 |

200

MANAGEMENT OF UNIT-BASED VIRTUAL ACCELERATOR RESOURCES

FIELD

The field relates generally to information processing systems, and more particularly to managing high-performance computing resources in such systems.

BACKGROUND

Various types of special-purpose processors, such as graphics processing units (GPUs) and other types of accelerators, have been developed for accelerated processing of specific types of workloads and advanced computing needs. The processing capabilities of GPU devices and other types of accelerators are currently being utilized in various applications to accelerate the processing of highly-parallelized computational workloads in various technical fields. However, there is currently no single metric that can represent multiple components of accelerator resource consumption. Accordingly, in existing accelerator management approaches, multiple distinct measurements need to be carried out and analyzed in connection with one or more computing workloads, creating inefficiencies.

Further driving datacenter designs and infrastructure deployments is the optimization of the multiple components of accelerator resource consumption within such designs. Consequently, the existing accelerator management approaches are insufficient in optimizing the use, value, and efficient deployment of accelerators within datacenters and elsewhere.

SUMMARY

Illustrative embodiments of the invention provide techniques for management of unit-based virtual accelerator resources. An exemplary computer-implemented method can include obtaining multiple accelerator device resource consumption measurements, wherein the measurements represent multiple accelerator device resource types consumed by one or more accelerator devices over a defined temporal interval. Such a method can also include computing a composite unit of measurement of accelerator device resource consumption, attributable to the one or more accelerator devices over the defined temporal interval, by normalizing the multiple accelerator device resource consumption measurements using a scaling factor that is based at least in part on one or more static aspects of the one or more accelerator devices. Further, such a method can additionally include outputting the composite unit of measurement to at least one user.

Illustrative embodiments can provide significant advantages relative to conventional accelerator management approaches. For example, challenges associated with multiple individually measured and analyzed resource consumption determinations are overcome through the use of a single composite resource consumption metric to describe an accelerator that has multiple elements (such as compute, memory, input-output (IO), etc.). Such a composite unit of measurement can be used in resource consumption measurement tasks, forecasting tasks, billing tasks, etc.

These and other illustrative embodiments described herein include, without limitation, methods, apparatus, systems, and computer program products comprising processor-readable storage media.

BRIEF DESCRIPTION OF THE DRAWINGS

FIG. 2 shows a table illustrating relationships between scaling factors and example accelerators in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
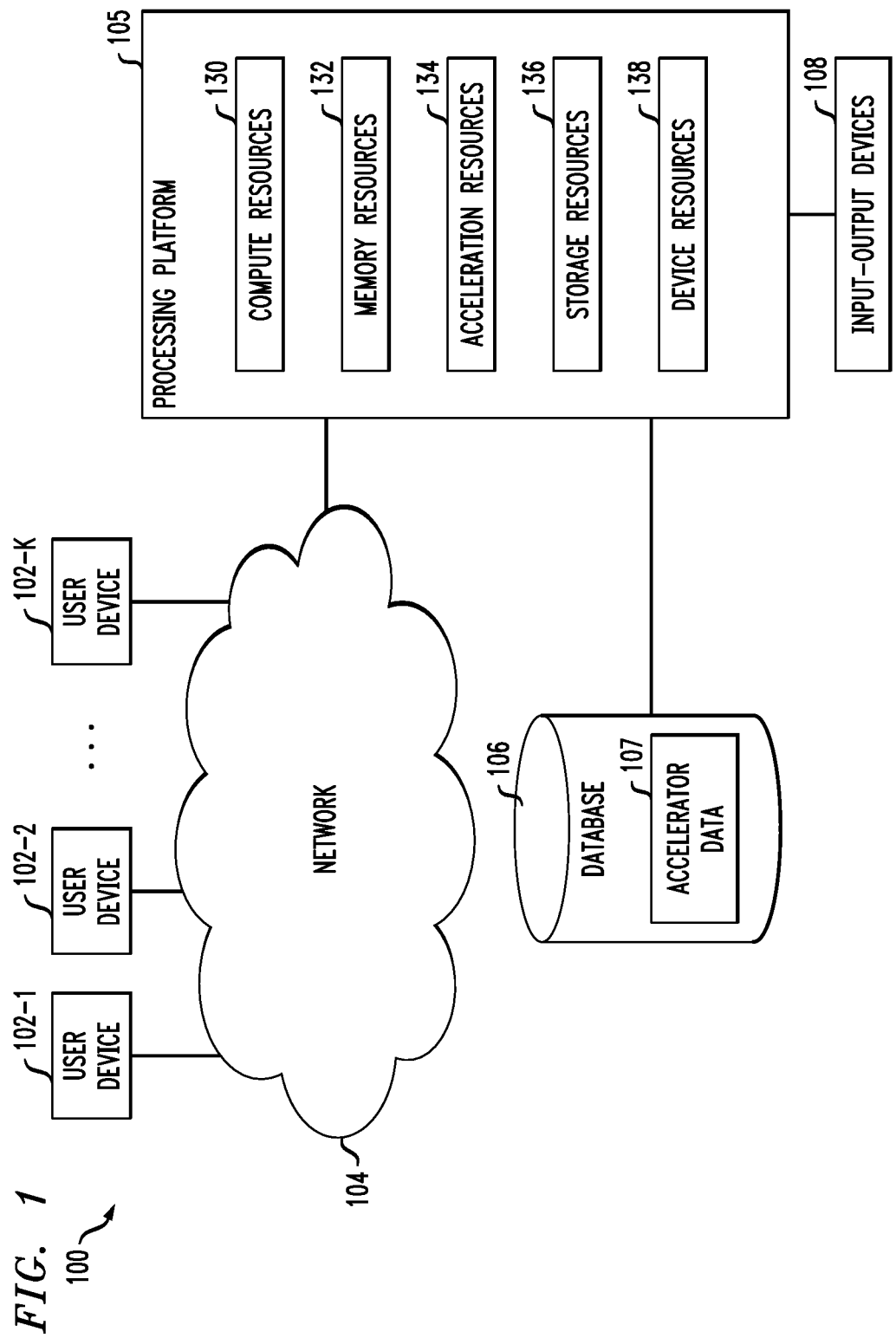
FIG. 1 shows an information processing system configured for management of unit-based virtual accelerator resources in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store data characterizing computing resources associated with a plurality of users. The database 106 more particularly stores accelerator device data 107 illustratively comprising consumption data pertaining to acceleration resources attributed to multiple users.

The database 106 in the present embodiment is implemented using one or more storage systems associated with the processing platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises compute resources 130, memory resources 132, acceleration resources 134, storage resources 136 and device resources 138. These and other processing platform 105 arrangements comprising components such as compute resources 130, memory resources 132, acceleration resources 134, storage resources 136 and device resources 138 should be viewed as examples of what are more generally referred to herein as "converged infrastructure" of an information processing system.

Components of the system 100 such as the resources 130 through 138 can each include one or more clients that can communicate with one or more of the user devices 102. Additionally, the processing platform 105 comprising components 130 through 138 can implement a plurality of resources of the converged infrastructure of the information processing system 100. Such a processing platform illustratively comprises multiple processing devices each comprising a processor coupled to a memory.

The acceleration resources 134 in some embodiments are configured for performance of a singular processing job of a particular type, and are therefore also referred to herein as a monolithic resource. By way of example, the acceleration resources 134 may be implemented utilizing a graphics processing unit (GPU), a tensor processing unit (TPU), a field-programmable gate array (FPGA), or an application-specific integrated circuit (ASIC), as well as various combinations of these and other specialized hardware acceleration elements. By way of additional example, one or more embodiments of the invention include being applicable to one or more additional and/or future types of accelerator devices and/or co-processors. The term "acceleration," as used herein, refers to performing certain functions faster and more efficient than is possible for executing such functions in software running on a more general-purpose processor (such as, for example, via compute resources 130).

As illustrated, the example embodiment of the invention depicted in FIG. 1 shows acceleration resources 134 as on-board resources/entities to a host processing platform 105. However, it is to be appreciated that one or more embodiments of the invention can also include implementation of a technology that allows off-host locations for acceleration resources 134, such as, for example, on a peripheral component interconnect (PCI) switch. Such an embodiment can also include, for example, one or more accelerators and a network connection from the off-host acceleration resources 134 to the host (such as platform 105).

Additionally, and by way of example, compute resources 130 can include virtual central processing units (CPUs). Similarly, memory resources 132 can include virtual flash memories, and storage resources 136 can include virtual storage volumes. Assuming that the device resources 138 include network interface resources, the network interface resources can include virtual network interface cards (NICs).

In one or more embodiments of the invention, the memory resources 132 can also include random access memory (RAM), read-only memory (ROM) or other types of memory, in any combination. Further, the memory resources 132 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The device resources 138, for example, allow the processing platform 105 to communicate over the network 104 with the user devices 102, and illustratively comprises one or more conventional transceivers.

It is to be understood that the particular set of elements shown in FIG. 1 for management of unit-based virtual accelerator resources involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

An exemplary process utilizing the processing platform 105 in computer network 100 will be described in more detail with reference to the flow diagram of FIG. 5.

As further detailed herein, at least one embodiment of the invention includes creating and implementing a single metric referred to herein as a micro-accelerator (also μAccelerator or μX) that can be used to represent the utilization of an accelerator device (accelerator) having multiple resource components (such as compute, memory, and memory bandwidth). Additionally, in one or more embodiments of the invention, this metric can be adjusted to different accelerators through the use of a non-linear scaling metric. The derived μAccelerator value can constitute, for example, the maximum of the consumption values across multiple accelerator resource types. Further, by way merely of example, the μAccelerator can be used as a unit of measurement for consumption-based measurement and billing for infrastructure management.

By way of illustration, in typical cloud-based accelerator deployments, accelerator consumption is billed in operational hours, a unit describing the time horizon over which a workload (physical machine, virtual machine, or container) is powered-on and consuming accelerator resources, with charge rates based on the notional size of the workload running. For example, a workload with one accelerator (for example, a GPU) and a given amount of accelerator memory will typically be billed at an hourly rate over the period that the workload is powered-on. In contrast, and by way merely of example, the μAccelerator introduces a different model in which the customer can be billed not for the potential consumption footprint of the workload, but rather the actual accelerator resources consumed by the workload.

In at least one embodiment of the invention, one or more of multiple components can represent one (1) μAccelerator. Such components can include accelerator type, which can include device type (GPU, TPU, FPGA, ASIC, etc.), device make and/or vendor, and device model. Such components can also include accelerator precision (such as, for example, half precision, single precision, or dual precision), accelerator compute (for example, transactions per second in teraflops (TFLOPS)), and accelerator memory (for example, accelerator memory used in gigabytes (GB)). Additionally, such components can include accelerator memory bandwidth (for example, the amount of bandwidth utilized between the accelerator and the accelerator memory) and timeframe (for example, a measurement window in units of minutes).

Accordingly, in at least one embodiment of the invention, the μAccelerator is a composite unit of measurement of accelerator resource consumption, normalized across multiple resource types (such as compute, memory, and memory bandwidth) using a scaling factor that is applied based on accelerator type and accelerator precision, with the derived μAccelerator value constituting the maximum of the consumption values across the multiple accelerator resource types.

As detailed herein, one or more embodiments of the invention includes implementation of a scaling factor to convert between different types of accelerators and precision levels, wherein such scaling can differ based at least in part on make and model of the accelerator, and the precision used for computation. Also, as used herein, processing power refers to the number of transactions an accelerator can process based on single precision, memory size (or RAM (random access memory) size) refers to the amount of memory attached to an accelerator, and memory bandwidth refers to an accelerator's ability to handle (large) amounts of data.

FIG. 2 shows a table 200 illustrating relationships between scaling factors and example accelerators in an illustrative embodiment. By way of illustration, table 200 depicts a column for accelerator labels, a column for accelerator types, a column for accelerator precision, a column for accelerator compute peak (measured in TFLOPS), a column for accelerator memory (measured in GB), a column for accelerator memory bandwidth (measured in GB per second (GB/s)), and a column for scaling factors. As described herein, the exact scaling factors are determined based on the type and characteristics of the accelerator represented. The scaling factors shown in table 200 are examples, and do not scale linearly.

At least one embodiment of the invention can also include multi-accelerator considerations that can influence scaling factors when utilizing multiple accelerators (such as GPUs) in support of one or more workloads. Such considerations can include, for example, training multiple models at once, distributed training; peripheral component interconnect express (PCIe) lanes, high-speed networks between combinations of multiple GPUs, trending for TPUs on single-precision, supporting multiple precision levels, etc.

In accordance with one or more embodiments of the invention, a micro-accelerator formula includes variables and constants. Such constants can include, for example, reference accelerator precision (RAP), reference time interval (RTI) for measurement (measured, for example, in minutes), reference processing power (RPP; measured, for example, in TFLOPS), reference accelerator RAM (RAR; measured, for example, in GB), and reference memory bandwidth (RMB; measured, for example, in GB/s) over the defined RTI for an entire cluster pool. The variables can include, for example, measured processing power (MPP; which represents the maximum processing power utilized over the defined RTI), measured accelerator RAM (MAR; which represents the accelerator RAM utilized over the defined RTI), and measured memory bandwidth (MMB; which represents the maximum memory bandwidth utilized over the defined RTI).

Accordingly, in at least one embodiment of the invention, a formula for calculating a micro-accelerator measurement can include the following:

$$\mu X = \sum_{i=1}^{n} \left\{ \max\left( \frac{\sum_{j=1}^{m} \mu X_{MMB}}{RMB}, \frac{\sum_{j=1}^{m} \mu X_{MPP}}{RPP}, \frac{\sum_{j=1}^{m} \mu X_{MAR}}{RAR} \right) \right\} \cdot \frac{1}{n}$$

$i \in [1, ..., n]$ $j \in [1, ..., m]$ $\frac{1}{f} \cdot n = 1$ h

As used above, "i" represents an index for an outer layer summation, "j" represents an index for inner summations for computer, memory, and memory bandwidth, "f" represents sampling frequency, "n" represents an upper bound for the outer layer summation using index 'i', and "m" represents an upper bound for the inner layer summations using index 'j'.

Below are multiple examples of scaling for various accelerators, provided in conjunction with table 200 in FIG. 2. In these examples, $\mu X_{normalized}$ represents a μX for reference hardware (NVIDIA V100 GPU running in single precision). A first example illustrates scaling for Accelerator1 (NVIDIA V100 GPU). In such an example, a workload of 1000 $\mu X_{Accelerator1}$, when run on Accelerator1 in single precision, will not be scaled, as this is the same configuration as the reference hardware: 1000 $\mu X_{Accelerator1} \cdot 1 = 1000$ $\mu X_{normalized}$. Also, a workload of 1000 $\mu X_{Accelerator1}$, when run on Accelerator1 in double precision, will be scaled by a multiple of 2.0:1000 $\mu X_{Accelerator1} \cdot 2 = 2000$ $\mu X_{normalized}$.

A second example illustrates scaling for Accelerator2 (a hypothetical TPU). In such an example, a workload of 1000 $\mu X_{Accelerator2}$, when run on Accelerator2 in single precision, will be scaled by a multiple of X, which normalizes the workload metric to $\alpha$ $\mu X$ on an NVIDIA V100 GPU (running in single precision): 1000 $\mu X_{Accelerator2} \cdot X = \alpha$ $\mu X_{normalized}$. A workload of 1000 $\mu X_{Accelerator2}$, when run on Accelerator2 in half precision, will be scaled by a multiple of Y, which normalizes the workload metric to $\beta$ $\mu X$ on an NVIDIA V100 GPU: 1000 $\mu X_{Accelerator2} \cdot Y = \beta \mu X_{normalized}$. Additionally, a workload of 1000 $\mu X_{Accelerator2}$, when run on Accelerator2 in double precision, will be scaled by a multiple of Z, which normalizes the workload metric to $\gamma$ $\mu X$ on an NVIDIA V100 GPU: 1000 $\mu X_{Accelerator2} \cdot Z = \gamma \mu X_{normalized}$.

A third example illustrates scaling for Accelerator3 (NVIDIA P100 GPU). In such an example, a workload of 1000 $\mu X_{Accelerator3}$, when run on Accelerator3 in single precision, for example, will be scaled by a multiple of 0.679, which normalizes the workload metric to 679 $\mu X$ on an NVIDIA V100 GPU: 1000 $\mu X_{Accelerator3} \cdot 0.679 = 679$ $\mu X_{normalized}$.

Also, a fourth example illustrates calculating the $\mu$Accelerator value for a workload on an NVIDIA V100 GPU. In such an example, consider a virtual machine, which, at some point in time, is consuming accelerator compute resources on an NVIDIA V100 in single precision, as follows: 120 TFLOPs of accelerator compute, 64 GB of accelerator memory, and 800 GB/s of accelerator memory bandwidth (which represents approximately two V100 GPUs for memory and bandwidth, but 10-12 V100 GPUs of compute). Accordingly, in such an example, each compute resource type can be normalized in terms of the corresponding $\mu$Accelerator ($\mu X$) measurement as follows:

$$\mu Accelerator \text{ compute calculation: } 120 TFLOPs \cdot \frac{1\mu X}{2\,TFLOPs} = 60\,\mu X_{compute}; \quad (1)$$

$$\mu Accelerator \text{ memory calculation: } 64 GB \cdot \frac{1\mu X}{2\,GB} = 32\,\mu X_{mem}; \quad (2)$$

and $$\mu Accelerator \text{ memory bandwidth calculation: } 800\frac{GB}{s} \cdot \frac{1\mu X}{112\,GB/s} = 7\,\mu X_{mem\_bandwidth}. \quad (3)$$

Additionally, in connection with one or more embodiments of the invention, in formulas (1), (2), and (3) above, the denominator for the left side of each equation includes numbers that are tied to the reference accelerator (NVIDIA V100 GPU in single precision). For equation (1), the formula calculates $\mu$Accelerator compute, and the 120 TFLOPs represent the MPP, while the 2 TFLOPs represent the RPP. Similar reference constants apply to equations (2) and (3) in regards to the 2 GB denominator for calculating $\mu X$ memory, and the 112 GB/s for calculating $\mu X$ memory bandwidth, respectively.

Accordingly, one or more embodiments of the invention can utilize constants for RPP (for example, wherein RPP=2 TFLOPs), RAR (for example, wherein RAR=2 GB, and RMB (for example, wherein RMB=112 GB/s). Such constants can, in one or more alternate embodiments of the invention, be adjusted based on the particular implementation.

Additionally, the calculated $\mu X$ value of accelerator consumption (for this example) can be derived as follows:

$$\max(\mu X_{compute}, \mu X_{mem}, \mu X_{mem\_bandwidth}) = 60\mu X. \quad (4)$$

Also, an expanded version of this calculated $\mu$Accelerator value can be represented as follows:

$$\max\left(120 TFLOPs \cdot \frac{1\mu X}{2\,TFLOPs}, \right. \quad (5)$$
$$\left. 64\,GB \cdot \frac{1\mu X}{2\,GB}, 800\frac{GB}{s} \cdot \frac{1\mu X}{112\,GB/s}\right) = 60\,\mu X$$

Figure 3:
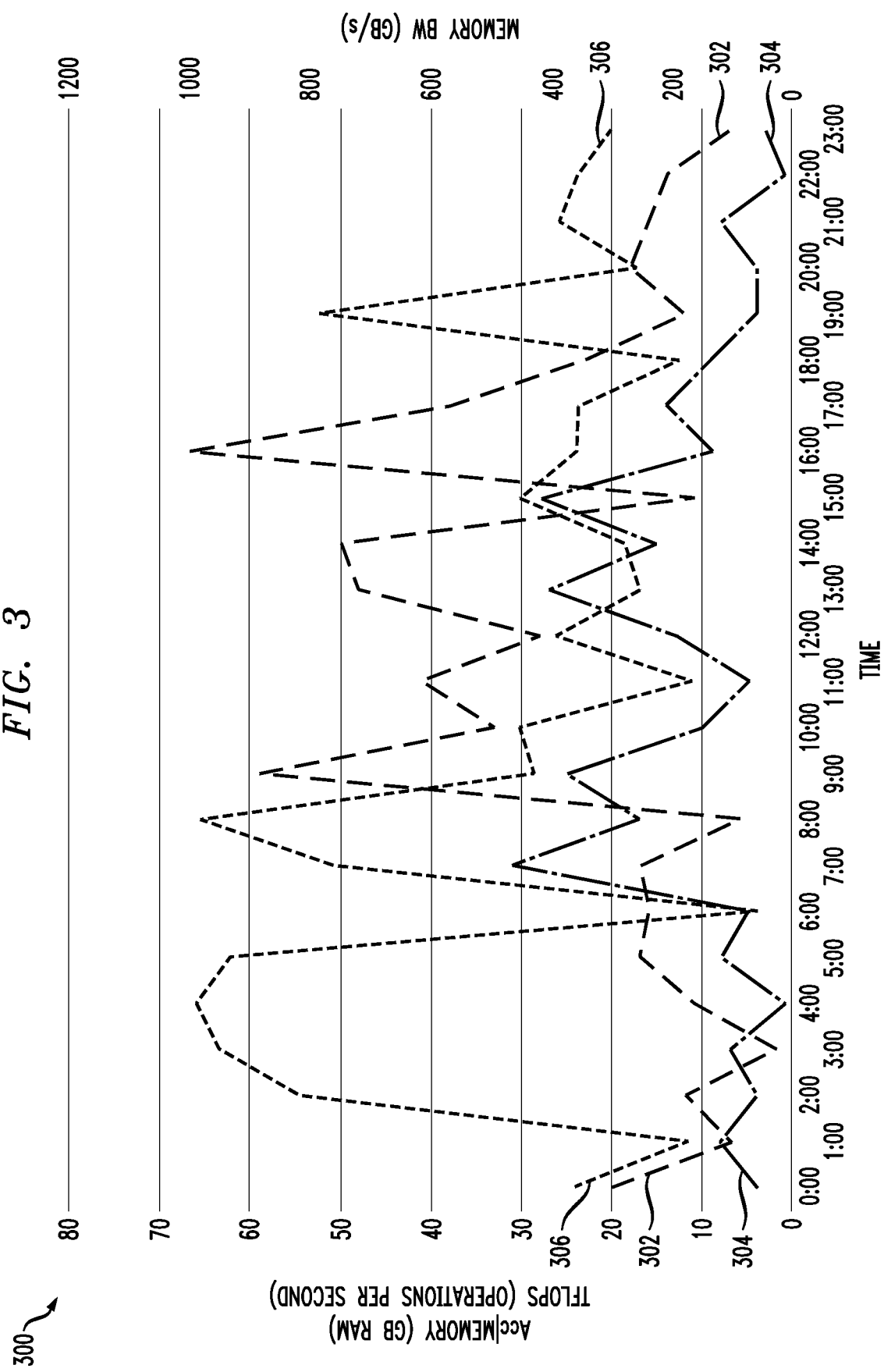
FIG. 3 shows a graph illustrating resource consumption of a notional virtual machine across three accelerator resource types in an illustrative embodiment.

FIG. 3 shows a graph 300 illustrating resource consumption of a notional virtual machine across three accelerator resource types in an illustrative embodiment. By way of illustration, FIG. 3 depicts time-based (hourly, in this example) resource consumption (illustrated in raw total amounts). Specifically, FIG. 3 illustrates resource consumption of compute resources (depicted as line 302), memory resources (depicted as line 304), and memory bandwidth (depicted as line 306). As also illustrated in FIG. 3, the x-axis of graph 300 represents time (depicted in hours in this example), and the y-axis of graph 300 represents resource consumption amounts. Specifically, the right side label of the y-axis denotes memory bandwidth amounts (measured, in this example, in GB/s), and the left side label of the y-axis denotes memory resources amounts (measured, in this example, in GB of RAM) as well as compute resources amounts (measured, in this example, in TFLOPS).

The transformations presented in equations (1)-(3) above can be applied to consumption signals, such as those illustrated in graph 300, to generate normalized $\mu X$ consumption per resource as a function of the same specified time scale, with the ultimate $\mu X$ consumption signal being defined as the maximum normalized consumption at each time instance, as detailed in equation (4) above. Such processes, and the results thereof, are detailed in connection with FIG. 4.

Figure 4:
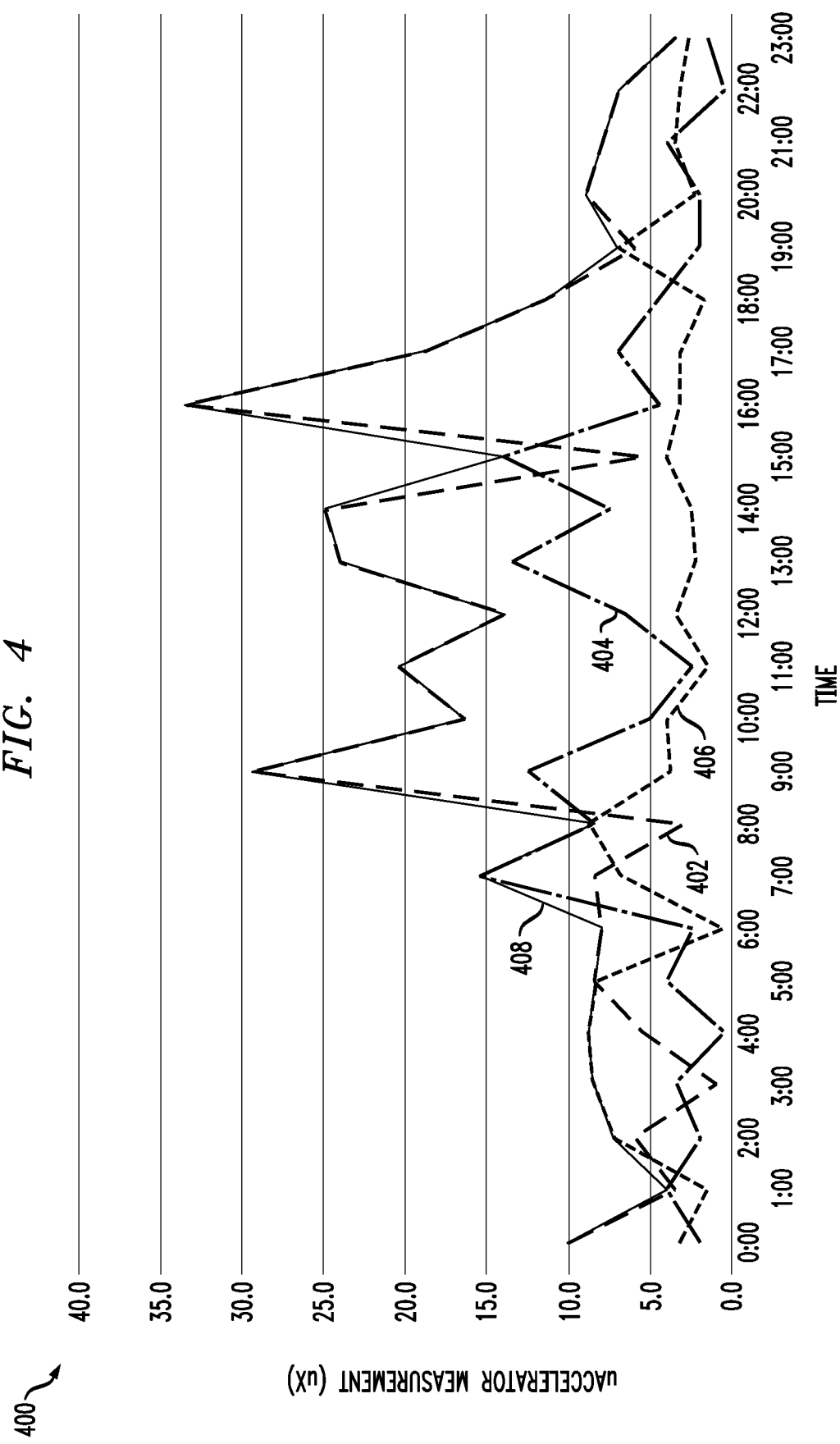
FIG. 4 shows a graph illustrating micro-accelerator components and maximum memory, compute, and memory bandwidth values for a memory and compute driven workload in an illustrative embodiment.

FIG. 4 shows a graph 400 illustrating micro-accelerator components and maximum memory, compute, and memory bandwidth values for a memory and compute driven workload in an illustrative embodiment. By way of illustration, FIG. 4 depicts the $\mu$A-derived values for memory resource consumption (depicted as line 404), compute resource consumption (depicted as line 402), and memory bandwidth (depicted as line 406). Additionally, FIG. 4 also illustrates an ultimate $\mu X$ consumption calculation, which is depicted by line 408. As also illustrated in FIG. 4, the x-axis of graph 400 represents time (depicted in hours in this example), and the y-axis of graph 400 represents $\mu X$ measurement amount.

Figure 5:
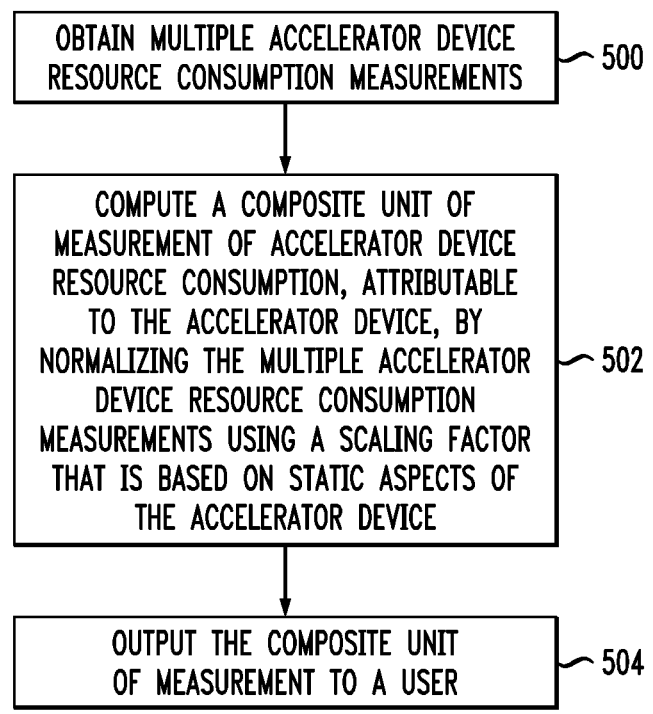
FIG. 5 is a flow diagram of a process for management of unit-based virtual accelerator resources in an illustrative embodiment.

FIG. 5 is a flow diagram of a process for management of unit-based virtual accelerator resources in an illustrative embodiment. It is to be understood that this particular process is only an example, and additional or alternative processes can be carried out in other embodiments.

In this embodiment, the process includes steps 500 through 504. These steps can be performed, for example, by the processing platform 105 in the FIG. 1 embodiment.

Step 500 includes obtaining multiple accelerator device resource consumption measurements, wherein the measurements represent multiple accelerator device resource types consumed by one or more accelerator devices over a defined temporal interval. The multiple accelerator device resource types can include accelerator device processing power, wherein the accelerator device resource consumption measurement pertaining to accelerator device processing power can include the maximum amount processing power utilized by the one or more accelerator devices over the defined temporal interval.

Additionally, the multiple accelerator device resource types can include accelerator device memory, wherein the accelerator device resource consumption measurement pertaining to accelerator device memory can include a total amount of memory utilized by the one or more accelerator devices over the defined temporal interval. One or more embodiments of the invention can also include consideration of fast and localized memory besides that embedded in an accelerator.

Also, the multiple accelerator device resource types can include accelerator device memory bandwidth, wherein the accelerator device resource consumption measurement pertaining to accelerator device memory can include the maximum amount of memory bandwidth utilized by the one or more accelerator devices over the defined temporal interval.

Step 502 includes computing a composite unit of measurement of accelerator device resource consumption, attributable to the one or more accelerator devices over the defined temporal interval, by normalizing the multiple accelerator device resource consumption measurements using a scaling factor that is based at least in part on one or more static aspects of the one or more accelerator devices. In one or more embodiments of the invention, the scaling factor comprises a non-linear scaling factor. Also, the one or more static aspects can include a level of precision attributed to the one or more accelerator devices, wherein the level of precision can include one of half precision, single precision, and dual precision.

Additionally, the one or more static aspects can include an accelerator device type attributed to the one or more accelerator devices, wherein the accelerator device type can include one of a GPU, a TPU, an FPGA, and an ASIC. Also, in one or more embodiments of the invention, the accelerator device type can include devices composed of resource constructs used for accelerator computing capabilities, one or more co-processors, etc. Further, the accelerator device type can include a make and a model of accelerator device.

Step 504 includes outputting the composite unit of measurement to at least one user. Outputting can include, for example, outputting the composite unit of measurement to at least one user in connection with one or more accelerator device resource consumption measurement-related tasks.

Accordingly, the particular processing operations and other network functionality described in conjunction with the flow diagram of FIG. 5 are presented by way of illustrative example only, and should not be construed as limiting the scope of the invention in any way. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments are configured to provide a single composite resource consumption metric to describe an accelerator that has multiple elements (such as compute, memory, IO, etc.). These and other embodiments can be used to carry out more efficient resource consumption measurement tasks, forecasting tasks, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Virtustream Enterprise Cloud, AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Virtustream Storage Cloud, Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
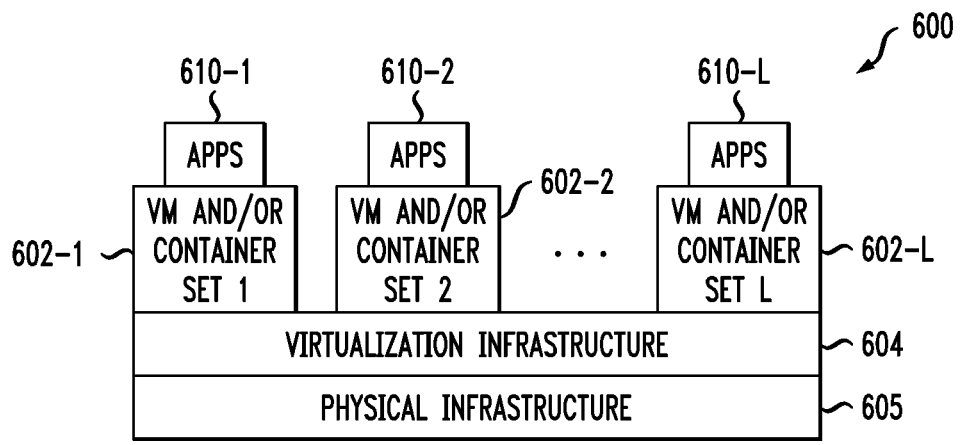
FIGS. 6 and 7 show examples of processing platforms that may be utilized to implement at least a portion of an information processing system in illustrative embodiments.
Figure 7:
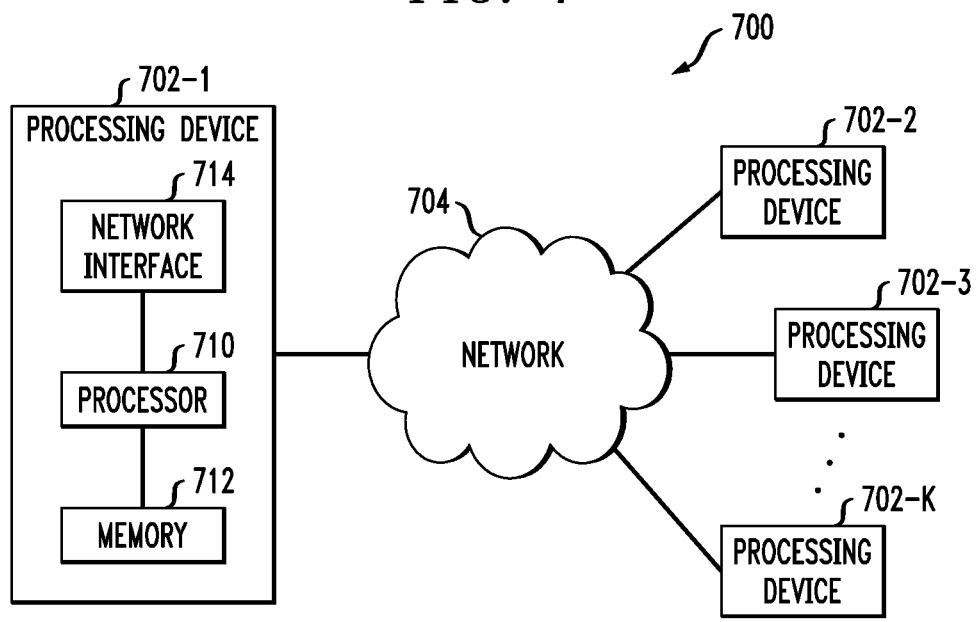

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide a composite unit of measurement of accelerator device resource consumption. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   obtaining multiple accelerator device resource consumption measurements, wherein the measurements represent multiple accelerator device resource types consumed by one or more accelerator devices over a defined temporal interval, wherein the multiple accelerator device resource types comprise accelerator device processing power, accelerator device memory, and accelerator device memory bandwidth;
   computing a composite unit of measurement of accelerator device resource consumption, attributable to the one or more accelerator devices over the defined temporal interval, wherein computing the composite unit of measurement of accelerator device resource consumption comprises:
   normalizing each of the multiple accelerator device resource consumption measurements using (i) a non-linear scaling factor that is based at least in part on static aspects of multiple accelerator devices and (ii) respective reference constants for the multiple accelerator device resource types, wherein the static aspects comprise multiple levels of computation precision attributed to the multiple accelerator devices and accelerator device types attributed to the multiple accelerator devices, wherein the multiple levels of computation precision comprise half precision, single precision, and dual precision; and
   calculating the composite unit of measurement of accelerator device resource consumption based at least in part on a maximum one of the normalized multiple accelerator device resource consumption measurements for the defined temporal interval; and
   outputting the composite unit of measurement to at least one user;
   wherein the method is performed by at least one processing device comprising a processor coupled to a memory.

2. The computer-implemented method of claim 1, wherein the accelerator device resource consumption measurement pertaining to accelerator device processing power comprises the maximum amount of processing power utilized by the one or more accelerator devices over the defined temporal interval.

3. The computer-implemented method of claim 1, wherein the accelerator device resource consumption measurement pertaining to accelerator device memory comprises a total amount of memory utilized by the one or more accelerator devices over the defined temporal interval.

4. The computer-implemented method of claim 1, wherein the accelerator device resource consumption measurement pertaining to accelerator device memory comprises the maximum amount of memory bandwidth utilized by the one or more accelerator devices over the defined temporal interval.

5. The computer-implemented method of claim 1, wherein the accelerator device type comprises one of a graphics processing unit, a tensor processing unit, a field-programmable gate array, and an application-specific integrated circuit.

6. The computer-implemented method of claim 1, wherein the accelerator device type comprises a make and a model of accelerator device.

7. The computer-implemented method of claim 1, wherein outputting comprises outputting the composite unit of measurement to at least one user in connection with one or more accelerator device resource consumption measurement-related tasks.

8. The computer-implemented method of claim 1, wherein the static aspects further comprise a compute peak value measured in floating point operations per second attributed to the one or more accelerator devices, memory capacity attributed to the one or more accelerator devices, and memory bandwidth attributed to the one or more accelerator devices.

9. A non-transitory processor-readable storage medium having stored therein program code of one or more software programs, wherein the program code when executed by at least one processing device causes the at least one processing device:
   to obtain multiple accelerator device resource consumption measurements, wherein the measurements represent multiple accelerator device resource types consumed by one or more accelerator devices over a defined temporal interval, wherein the multiple accelerator device resource types comprise accelerator device processing power, accelerator device memory, and accelerator device memory bandwidth;

to compute a composite unit of measurement of accelerator device resource consumption, attributable to the one or more accelerator devices over the defined temporal interval, wherein computing the composite unit of measurement of accelerator device resource consumption comprises:

normalizing each of the multiple accelerator device resource consumption measurements using (i) a non-linear scaling factor that is based at least in part on static aspects of multiple accelerator devices and (ii) respective reference constants for the multiple accelerator device resource types, wherein the static aspects comprise multiple levels of computation precision attributed to the multiple accelerator devices and accelerator device types attributed to the multiple accelerator devices, wherein the multiple levels of computation precision comprise half precision, single precision, and dual precision; and calculating the composite unit of measurement of accelerator device resource consumption based at least in part on a maximum one of the normalized multiple accelerator device resource consumption measurements for the defined temporal interval; and to output the composite unit of measurement to at least one user.

10. The non-transitory processor-readable storage medium of claim 9, wherein the accelerator device type comprises one of a graphics processing unit, a tensor processing unit, a field-programmable gate array, and an application-specific integrated circuit.

11. The non-transitory processor-readable storage medium of claim 9, wherein the static aspects further comprise a compute peak value measured in floating point operations per second attributed to the one or more accelerator devices, memory capacity attributed to the one or more accelerator devices, and memory bandwidth attributed to the one or more accelerator devices.

12. The non-transitory processor-readable storage medium of claim 9, wherein outputting comprises outputting the composite unit of measurement to at least one user in connection with one or more accelerator device resource consumption measurement- related tasks.

13. The non-transitory processor-readable storage medium of claim 9, wherein the accelerator device type comprises a make and a model of accelerator device.

14. The non-transitory processor-readable storage medium of claim 9, wherein the accelerator device resource consumption measurement pertaining to accelerator device memory comprises a total amount of memory utilized by the one or more accelerator devices over the defined temporal interval.

15. An apparatus comprising:
at least one processing device comprising a processor coupled to a memory;
the at least one processing device being configured:
to obtain multiple accelerator device resource consumption measurements, wherein the measurements represent multiple accelerator device resource types consumed by one or more accelerator devices over a defined temporal interval, wherein the multiple accelerator device resource types comprise accelerator device processing power, accelerator device memory, and accelerator device memory bandwidth;

to compute a composite unit of measurement of accelerator device resource consumption, attributable to the one or more accelerator devices over the defined temporal interval, wherein computing the composite unit of measurement of accelerator device resource consumption comprises:

normalizing each of the multiple accelerator device resource consumption measurements using (i) a non-linear scaling factor that is based at least in part on static aspects of multiple accelerator devices and (ii) respective reference constants for the multiple accelerator device resource types, wherein the static aspects comprise multiple levels of computation precision attributed to the multiple accelerator devices and accelerator device types attributed to the multiple accelerator devices, wherein the multiple levels of computation precision comprise half precision, single precision, and dual precision; and calculating the composite unit of measurement of accelerator device resource consumption based at least in part on a maximum one of the normalized multiple accelerator device resource consumption measurements for the defined temporal interval; and to output the composite unit of measurement to at least one user.

16. The apparatus of claim 15, wherein the accelerator device type comprises one of a graphics processing unit, a tensor processing unit, a field-programmable gate array, and an application-specific integrated circuit.

17. The apparatus of claim 15, wherein the static aspects further comprise a compute peak value measured in floating point operations per second attributed to the one or more accelerator devices, memory capacity attributed to the one or more accelerator devices, and memory bandwidth attributed to the one or more accelerator devices.

18. The apparatus of claim 15, wherein outputting comprises outputting the composite unit of measurement to at least one user in connection with one or more accelerator device resource consumption measurement-related tasks.

19. The apparatus of claim 15, wherein the accelerator device type comprises a make and a model of accelerator device.

20. The apparatus of claim 15, wherein the accelerator device resource consumption measurement pertaining to accelerator device memory comprises a total amount of memory utilized by the one or more accelerator devices over the defined temporal interval.

* * * * *